UNITED STATES PATENT OFFICE.

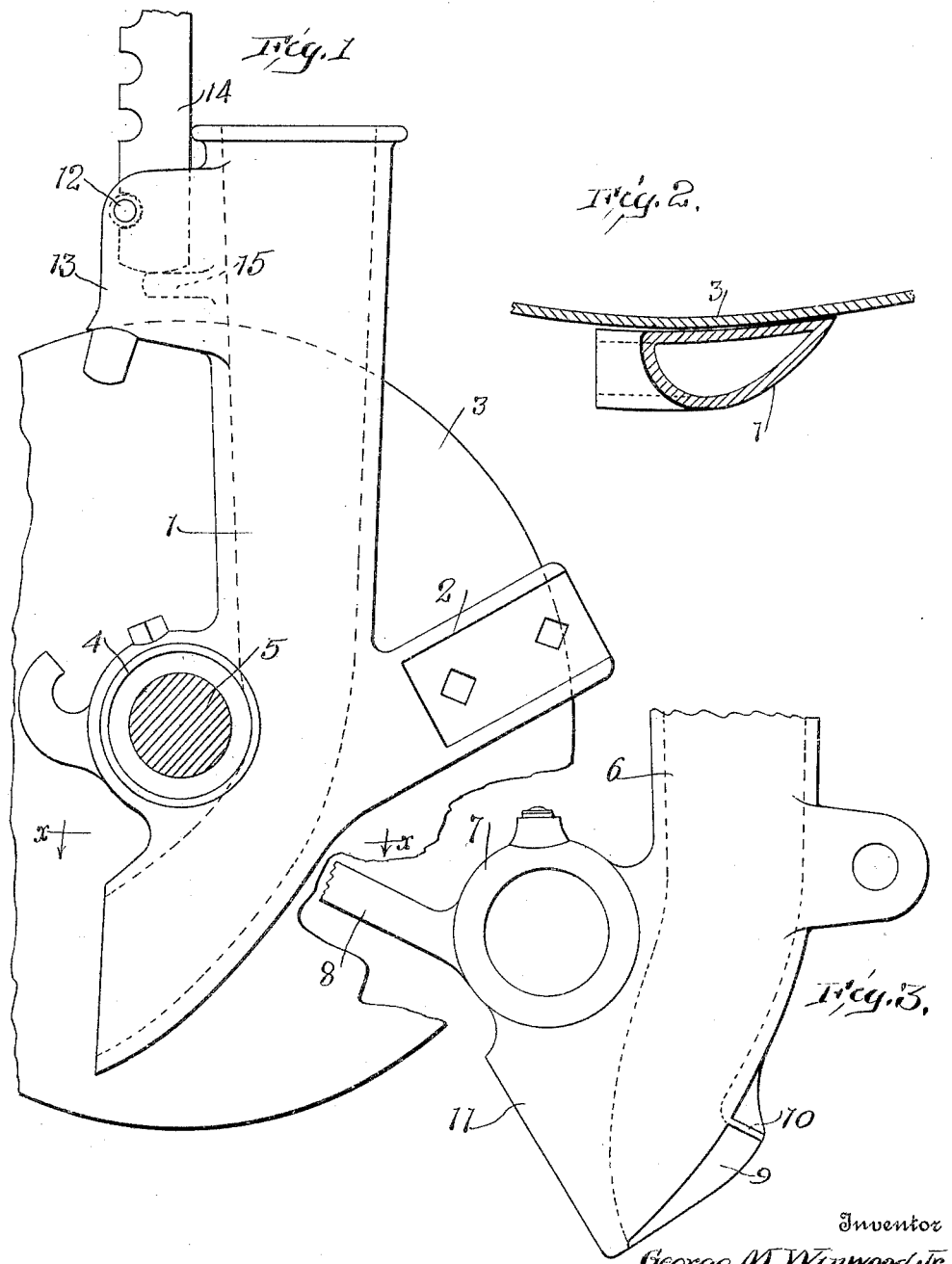

GEORGE M. WINWOOD, JR., OF SPRINGFIELD, OHIO.

SEED-BOOT FOR SEED-DRILLS.

1,116,525.   Specification of Letters Patent.   Patented Nov. 10, 1914.

Application filed July 13, 1912. Serial No. 709,303.

*To all whom it may concern:*

Be it known that I, GEORGE M. WINWOOD, Jr., a citizen of the United States, residing at Springfield, in the county of Clark and State of Ohio, have invented certain new and useful Improvements in Seed-Boots for Seed-Drills, of which the following is a specification, reference being had therein to the accompanying drawing.

This invention relates to seed boots for seed drills and the object of the invention is to provide in a disk drill a seed boot which will discharge the seed into the furrow below the center of the disk, this being the deepest portion of the furrow.

A further object is to provide means to prevent accumulations of trash, such as stubble and grass, from closing the discharge opening of the boot or interfering with the discharge of the grain therefrom, and, to this end, it is also an object of the invention to so shape the boot that the trash will not wrap about and cling to the same.

In the accompanying drawings, Figure 1 is a side elevation of a boot embodying my invention, showing the disk partially broken away; Fig. 2 is a transverse, sectional view taken on the line *x x* of Fig. 1 and looking in the direction of the arrows; and Fig. 3 is a side elevation of the lower portion of a modified form of the boot.

In the accompanying drawings I have illustrated two embodiments of my invention differing slightly in their details of construction but both accomplishing the same result in substantially the same manner.

In that form of the invention illustrated in Fig. 1 the boot is indicated as a whole by the reference numeral 1 and has a substantially straight shank or upper portion and is provided on its forward portion with a bracket 2 by means of which it may be connected with the usual drag bar.

The boot is mounted on one side or the other of the axis of a furrow opening disk, indicated at 3, and, in the present instance, the boot is provided on its rear side with a bearing 4 in which is rotatably mounted the journal 5 of the disk 3. The lower portion of the boot is curved downwardly and rearwardly so that its discharge opening is arranged in a substantially vertical plane in the rear of the boot and is so positioned that it will discharge the grain into the furrow below the center of the disk, or in a vertical line with the bearing 4, thus placing the grain in the deepest portion of the furrow. As illustrated in Fig. 1 the discharge opening is slightly in the rear of the axial center of the disk but it will be obvious that a slight variation from the central position is immaterial. While the vertical center of the disk is in the deepest portion of the furrow the circumference of the disk is such that there is no material diminution of the depth of the furrow for an inch or two on either side of the center of the disk. Consequently, if the discharge opening is arranged at substantially the center the result is substantially the same.

Means are also provided to prevent grass, stubble or other trash from accumulating about the lower portion of the boot and closing or partially closing the discharge opening in such a manner as to interfere with the discharge of the seed therefrom. In that form of the boot shown in Fig. 1 this is accomplished by so shaping the boot that the trash will not cling thereto but will be forced either to one side or into the furrow, thus permitting the boot to pass. The lower portion of the boot is preferably flat on the side adjacent to the disk and the outer portion is so formed that the forward portion of the boot presents a comparatively sharp edge to the trash. This edge is curved downwardly and rearwardly in such a manner that the grass or other trash will not wrap about the same but will be forced to one side.

In Fig. 3 I have illustrated a modified form of the invention and have shown the same as comprising a boot 6 having its upper portion substantially similar to that shown in Fig. 1. Only a part of the upper portion or shank of the boot is shown, the upper part being broken away. This boot is shown as mounted in the rear of the axis of the disk and as having a bearing 7 for the journal of the disk arranged in front of the boot and provided with a bracket 8 for connecting the disk to the drag bar. The conduit extends forwardly to a point beneath the bearing 7 and the discharge opening is so arranged as to place the grain in the furrow below the center of the disk. The boot is provided on its inner side, that is, the side adjacent to the disk, with a rearwardly extending lip 9 which projects beyond the feed opening, and the boot is also provided above the feed opening with an outwardly extending lip or flange 10. These two lips serve to prevent the trash from wrapping about the end of the boot in such a manner as to obstruct the discharge opening of the boot. No matter how tightly the grass may wrap about the boot it will be held from the discharge opening by the lips and the dirt will be prevented from accumulating between the trash and the boot by the upper lip. The lower portion of the discharge opening is so close to the point of the boot that the trash will not cling to the boot in such a manner as to close the opening and for this reason the lip 9 is of less width at its lower end than at its upper portion. The forward edge of the boot, as indicated at 11, is inclined downwardly and rearwardly and serves to deflect the trash and prevent the same from clinging to the boot. If desired I may also provide the boot with a steel pin or lug 12 which is cast into the bracket 13 and is adapted to engage the bar or pressure rod 14, the lower end of which is adapted to engage a supporting lug 15. By forming the pin 12 of steel a much more durable construction is provided and moreover the construction is solid instead of being made in the nature of a loose connection.

While I have illustrated two embodiments of the invention each accomplishing substantially the same results in slightly different manners it will be understood that these are chosen for the purpose of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a furrow opening disk and a journal therefor, of a closed boot or seed conduit formed independently of said disk, mounted on said journal, extending downwardly on one side of and close to said disk and close to said journal, having its lower portion curved to bring it beneath said journal and having its discharge opening directed rearwardly to prevent the entrance of dirt at the bottom thereof and arranged to discharge the seed at a point beneath said journal and near the lowest portion of the edge of said disk, said boot having one side shaped to fit snugly against the adjacent face of said disk and having its other side converging toward the first-mentioned side to form a narrow edge on the forward and rearwardly extending lower portions of said boot.

2. The combination, with a furrow opening disk, and a journal, therefor, of a boot mounted on said journal extending downwardly therefrom, having its lower portion curved rearwardly and having a rearwardly directed discharge opening arranged at a point beneath said journal and near the lowest portion of the edge of said disk, said boot having one side arranged close to the adjacent face of said disk and also having a rearwardly projecting lip arranged above said discharge opening and a rearwardly extending flange arranged along the inner side of said discharge opening.

In testimony whereof, I affix my signature in presence of two witnesses.

GEORGE M. WINWOOD, Jr.

Witnesses:
ROBERT F. PLAGEMANN,
E. W. MCCARTNEY.

Copies of this patent may be obtained for five cents each, by addressing the "Commissioner of Patents, Washington, D. C."